Figure 1:
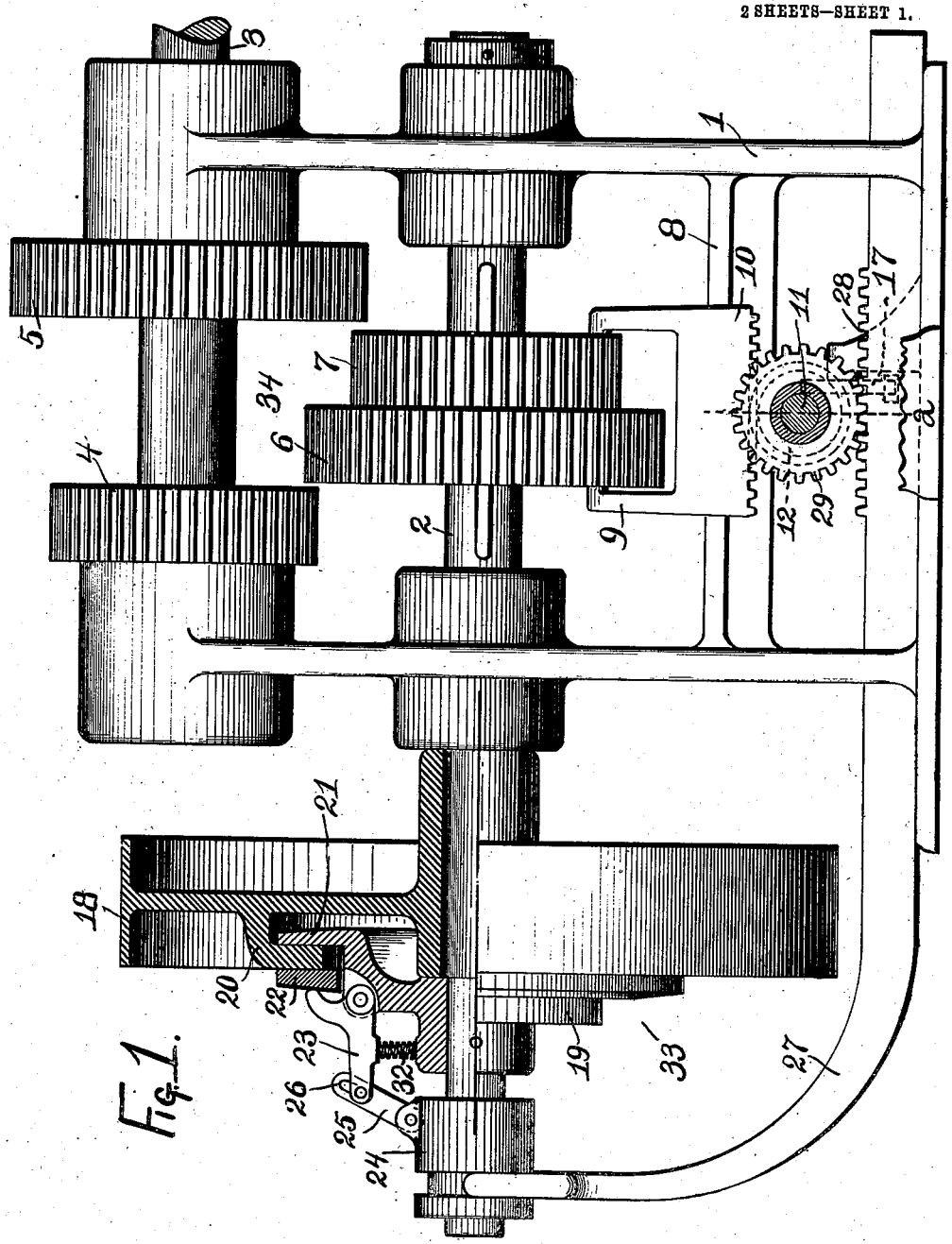

No. 858,764. PATENTED JULY 2, 1907.
W. T. SEARS.
POWER TRANSMISSION APPARATUS.
APPLICATION FILED SEPT. 28, 1906.

2 SHEETS—SHEET 1.

Witnesses:
Elmer R. Shipley.
M. S. Belden.

Willard Thomas Sears
Inventor
by James W. See
Attorney

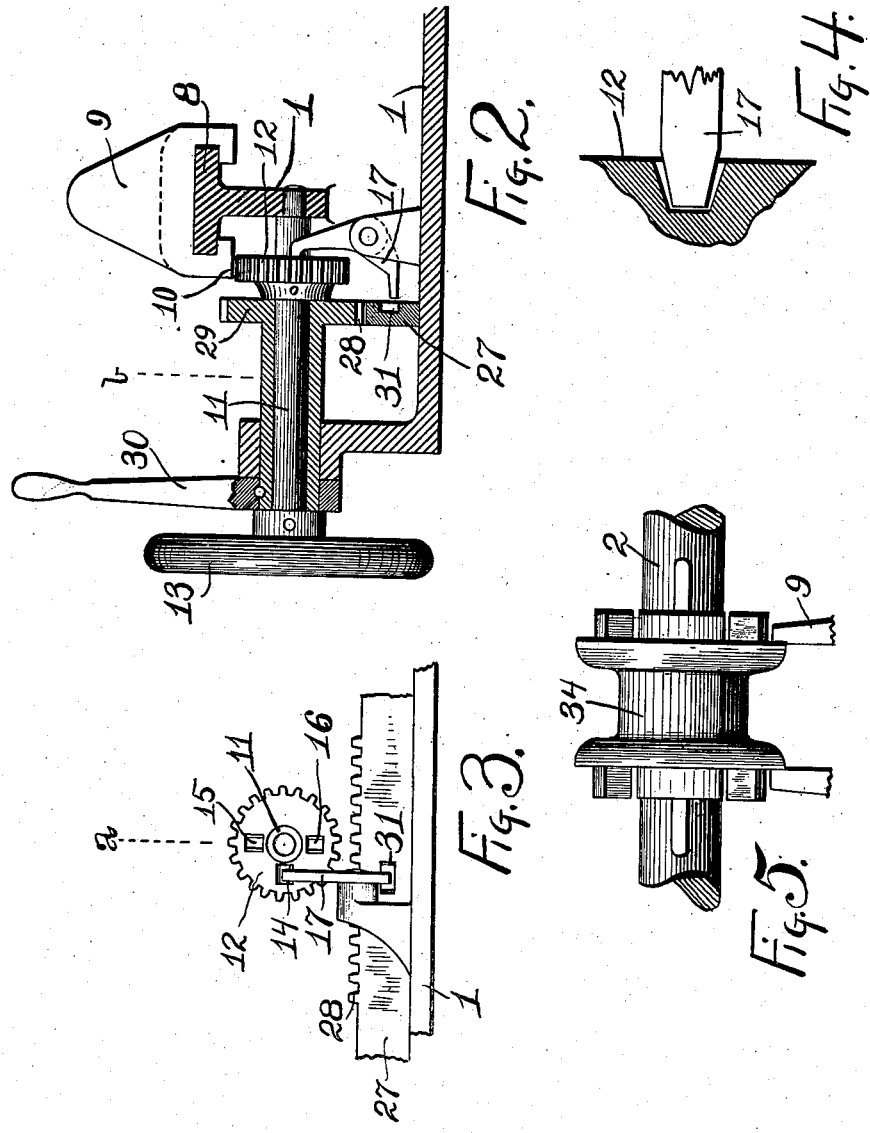

UNITED STATES PATENT OFFICE.

WILLARD THOMAS SEARS, OF PHILADELPHIA, PENNSYLVANIA, ASSIGNOR TO NILES-BEMENT-POND COMPANY, OF JERSEY CITY, NEW JERSEY.

POWER-TRANSMISSION APPARATUS.

No. 858,764.     Specification of Letters Patent.     Patented July 2, 1907.

Application filed September 28, 1906. Serial No. 336,583.

*To all whom it may concern:*

Be it known that I, WILLARD THOMAS SEARS, a citizen of the United States, residing at Philadelphia, Philadelphia county, Pennsylvania, have invented certain new and useful Improvements in Power-Transmission Apparatus, of which the following is a specification.

This invention, pertaining to improvements in power transmission apparatus will be readily understood from the following description taken in connection with the accompanying drawings in which:—

Figure 1 is a front elevation, part vertical section, of an apparatus exemplifying my invention: Fig. 2 a vertical transverse section of the same in the plane of line a: Fig. 3 a rear elevation of the interlocking devices: Fig. 4 a plan of the interlocking tooth: and Fig. 5 a front elevation of the sliding member shown in modified form.

Where, in transmitting mechanism, the speed or direction of rotation of a rotary part is changed by engaging and disengaging toothed transmitting agents, such as sliding toothed gears, tumbling toothed gears, or sliding toothed clutches, troubles often arise by reason of the clashing of the teeth due to teeth not being directly opposite tooth-spaces at the instant when engagement is sought to be made. In the case of sliding gears a lack of register on the part of the teeth may entirely prevent the desired sliding motion, and if register is perfect and the teeth of the sliding member start in while the parts are in full motion at full power, the hard work of the teeth begins when they first start into engagement, thus imposing extraordinary duty upon inadequate tooth-bodies, resulting often in the breaking of teeth and always in the wearing away or beveling of the tooth ends under continued use. This beveling, as it occurs, adds still further to the difficulty of engaging the teeth, the tendency of the motions being to disengage the teeth the instant they start into engagement. Again, if the engagement or disengagement be effected while the parts are under full speed or power, the work of shifting the movable member becomes considerable in the case of somewhat heavy machinery. Again, at considerable speeds, serious noises are incident to the indisposition of the toothed members to go into prompt and satisfactory engagement. Again, under the general conditions stated, where engagement can be effected only after quite a number of trials, promptness of action becomes sacrificed with possibly serious results.

My present invention provides for the shifting of a first toothed member into or out of engagement with a second toothed member while the first toothed member is energized by rotation but while the major portion of its driving power is cut off.

I exemplify my invention by a device involving sliding toothed gears, but sliding toothed gears, while representing the best form in which I contemplate embodying my invention, are to be taken as typical only of shifting toothed members employed in a power transmission system and requiring to be engaged and disengaged in changing direction of motion or speed of motion or condition as to rest and motion.

In the drawings:—1, indicates housing parts: 2, the driving shaft: 3, the driven shaft: 4, a gear fast on the driven shaft: 5, a larger gear fast on the driven shaft: 6, a gear splined on the driving shaft to match gear 4: 7, a gear splined on the driving shaft and united with gear 6 to match gear 5: 8, a guideway: 9, a carriage sliding on the guideway and engaging the gears 6 and 7 to serve in sliding them into engagement with their respective mating gears: 10, a rack on the carriage: 11, an adjusting shaft: 12, a gear on the adjusting shaft and engaging the rack on the carriage: 13, a handwheel on the adjusting shaft, whereby the turning of the hand-wheel results in the endwise shifting of the carriage and the moving of gears 6 and 7 into and out of engagement with their respective mating gears: 14, 15 and 16, a series of notches in the face of gear 12: 17, a locking lever mounted on a fixed pivot and having one of its ends adapted to engage in either of the notches in gear 12: 18, the driving pulley, loose on the driving shaft: 19, a friction clutch member fast on the shaft to coöperate with the pulley: 20, the friction member of the driving pulley: 21, one of the gripping members carried by clutch member 19 and coöperating with friction member 20: 22, the second friction member carried by clutch member 19: 23, a lever carried by clutch member 19 to serve in clamping friction member 20 between friction members 21 and 22 to frictionally lock the driving pulley to the driving shaft: 24, the sliding collar for engaging and releasing the friction clutch: 25, a link connecting the sliding collar with lever 23: 26, a slot in link 25 whereby the inward sliding of collar 24 will positively operate lever 23 and cause the friction clutch to engage while the movement of the collar to the left, while permitting the friction clutch to release does not positively enforce such release: 27, a sliding clutch-operating bar connected with the sliding collar: 28, a rack on this sliding bar: 29, a gear engaging this rack and having a hollow spindle mounted loosely upon adjusting shaft 11: 30, a hand-lever on the hollow spindle of gear 29: 31, a notch in the clutch-operating bar, in position to be engaged by the second end of locking lever 17 when the clutch is released: 32, a spring acting on clutch lever 23 and tending to hold the friction clutch in condition of light engagement: 33, the friction clutch considered as a whole: and 34, the sliding toothed member represented by gears 6 and 7, in Fig. 1, considered as a whole.

The friction clutch is engaged and released by the operation of hand lever 30. The sliding toothed member is shifted into or out of either of its active positions by manipulating hand-wheel 13. Disregard, for the moment, the presence of spring 32, assuming it absent, and similarly disregard locking lever 17. Under these conditions the device would operate in the usual defective manner, that is to say, if the friction clutch were disengaged and the driving shaft at rest and an attempt were made to shift the sliding toothed member to active position, its teeth might or might not enter the tooth-spaces of the other gears, and engagement could not be effected without, by some means, giving partial rotation to one of the gears. If, on the other hand, the clutch were engaged and the driving shaft in motion at full power then, while opportunities for the engagement of the teeth would be sure to present themselves, immediately or shortly, the teeth would require to transmit full power the instant any degree whatever of engagement had been effected, thus bringing full working strain on perhaps a mere trifle of tooth-length, and the work of completing the shifting into full engagement would be resisted by the strain of driving at full power. In other words, the driven shaft would pick up full degree of motion the instant the teeth engaged, no matter how incomplete that engagement might be. The heavy strain imposed on partial tooth length tends to break the teeth and to bevel off their ends as well as to increase the difficulty of completing the engagement. This general analysis of defect would hold good whether the toothed members were sliding gears or tumbling gears or were toothed clutches of the type indicated in Fig. 5, which will be recognized as an ordinary sliding jawed or toothed clutch-member splined on a shaft. All of these matters are well understood by those familiar with this general art. But in the analysis just made no regard has been had for the presence of spring 32. Consideration is now to be given to the action of this spring. When collar 24 is shifted to the left, thus releasing the friction clutch, its firm and powerful gripping is released but the release is not positive and, owing to the presence of spring 32, the friction clutch is still maintained in condition of mild engagement, in fact it never completely releases. The tension of spring 32 is to be such as to endow the friction clutch with sufficient gripping power to turn the driving shaft and its parts idly, but not with sufficient power to turn that shaft when it is geared to the driven shaft.

Now, under these new conditions the operation may be as follows. Taking the parts as in Fig. 1 with the gears disengaged, and with the friction clutch released so far as its main gripping is concerned, the driving shaft and the sliding gear structure will be turning with light power. The sliding gears may now be shifted readily, for the turning of those gears will bring teeth into proper register with tooth-spaces and permit the engagement of the teeth to be initiated, and as soon as this is done the driving shaft comes to rest, by reason of the slipping of the lightly gripped friction clutch, and the completion of the gear shifting may be effected while the inter-membering teeth are free from the strain of heavy driving work. Similarly, assuming gears to be engaged and the machine at full work, the friction clutch may be released, as to its main gripping, whereupon the driving shaft comes to rest notwithstanding the light auxiliary gripping of the friction clutch, and the engaging teeth will be easily disengaged, the driving shaft and its gears again taking up their rotation under light driving power when the teeth are completely disengaged.

The device as thus far analyzed provides for perfectly satisfactory engagement and disengagement of teeth if properly handled, that is to say, if care be taken to release the main driving power of the friction clutch before attempting to shift the sliding member. But I prefer to employ, as a refinement, an interlocking device to insure the proper manipulation. In Fig. 1 assume that the upper end of locking lever 17 is in the middle notch, 14, of the carriage shifting gear. If this tooth cannot get out of the notch then the carriage cannot be shifted. When the clutch is engaged then the clutch-operating bar prevents the rocking of the locking lever, consequently the carriage cannot be shifted while the clutch is engaged. But when the clutch is disengaged then notch 31 in the clutch operating bar is opposite the lower end of the locking lever and permits that lever to rock and disengage its upper tooth from gear 12. The lever ends and notches are of beveled character so as to disengage if otherwise permitted to do so. Similarly as to the other two positions of the carriage gear, in which positions the carriage is locked by the engagement of the locking lever with notches 15 or 16 except when the released condition of the clutch results in notch 31 coming opposite the lower end of the locking lever. It is also to be observed that a further result of this locking device is that the clutch cannot be thrown into engagement except when one of the notches in the carriage operating gear is opposite the upper end of the locking lever or, in other words, when the sliding gear-structure is entirely engaged or entirely disengaged.

It is of course to be understood that the clutch construction illustrated is merely an example typifying means for applying and cutting off the main power from a shiftable toothed transmission member. I have simply set forth the principle of my invention and have illustrated the best manner in which I at present contemplate applying that principle.

I claim:

1. Power transmission apparatus comprising a driving member, a driven member to receive motion therefrom, a transmitting connection carried by one of said members and having constant normally-mild engagement with the other member whereby the driven member is permitted to yield relatively to the driving member, and hand-operative means for rendering the transmission positive without reversing the direction of motion, combined substantially as set forth.

2. Power transmission apparatus comprising a driving member, a driven member, a constantly-engaged friction clutch device for transmitting motion from the driving to the driven member by mild engagement whereby the driven member is permitted to yield relatively to the driving member, and hand-operative means for firmly engaging the clutch for positively transmitting the motion, combined substantially as set forth.

3. Power transmission apparatus comprising a driving member, a driven member to receive motion therefrom, a transmitting connection carried by one of said members and having mild engagement with the other member whereby the driven member is permitted to yield relatively to the driving member, supplemental means for causing the motion to be positively transmitted, a pair of mating toothed members to receive motion from said driven member, one of said tooth members being shiftable, a shifter for the shiftable toothed member, hand-operative means for controlling said supplemental means and shifter, and a locking device controlled by the shifter and serving to prevent the action of said supplemental means except when the toothed members are in certain relation to each other, combined substantially as set forth.

WILLARD THOMAS SEARS.

Witnesses:
E. H. WRAY,
SAMUEL C. KANE.